Patented Apr. 20, 1954

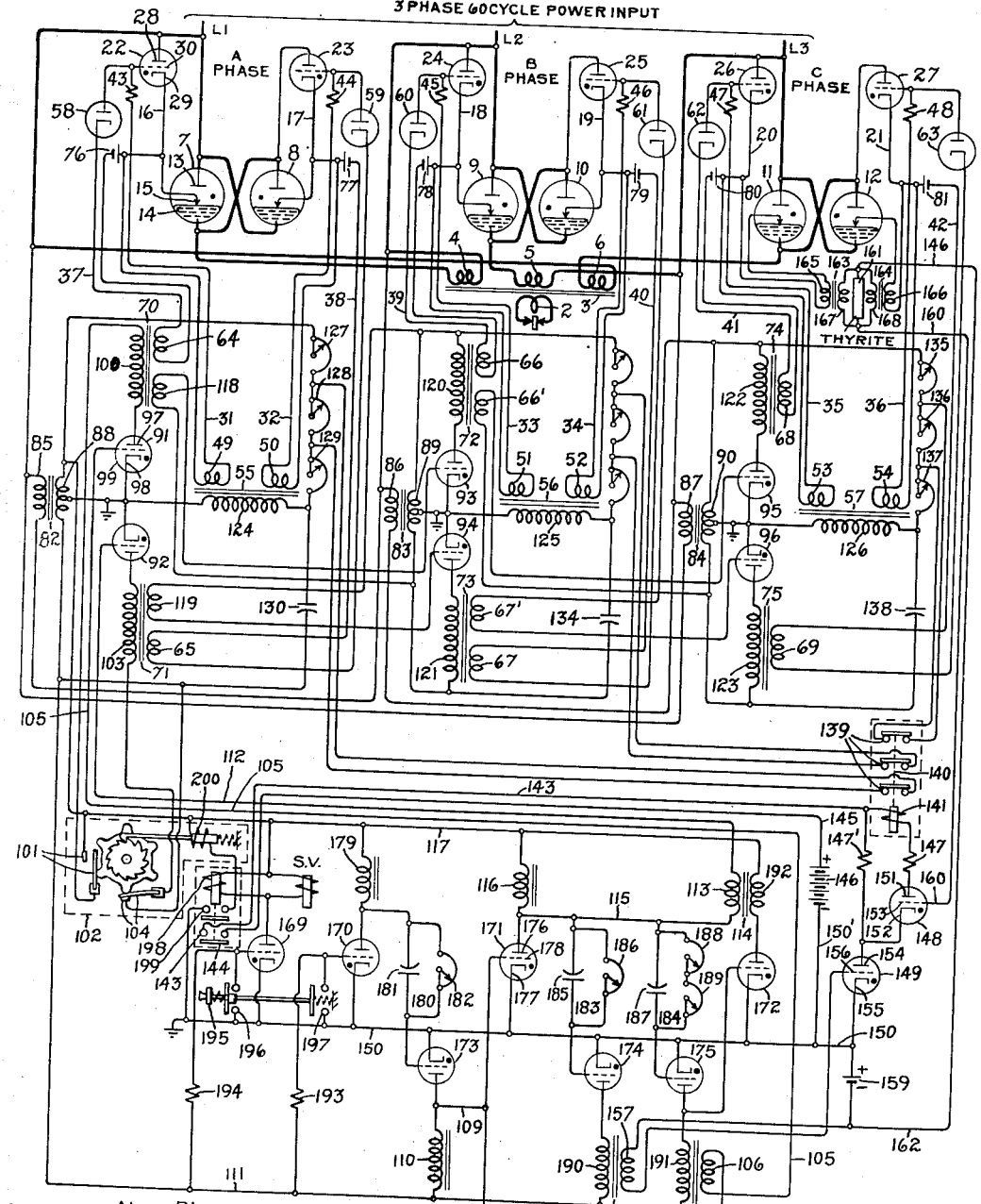

2,676,297

UNITED STATES PATENT OFFICE 2,676,297

ELECTRONIC CONTROL CIRCUITS

William B. Hills and Carter Sinclair, Schenectady, N. Y., assignors to General Electric Company, a corporation of New York Application June 21, 1952, Serial No. 294,906

16 Claims. (Cl. 323—22)

Our invention relates to electronic control circuits and more particularly to frequency and phase converting systems embodying electronic control means operating in response to the firing of one of the main electric discharge devices in the polyphase supply circuit thereof for changing without interruption the load current flow from one value to another at a selected point in the low frequency single phase half cycle supplied by such system.

Frequency and phase converting systems are employed for supplying a single phase resistance welding load from a polyphase source of supply because of certain advantages such as, uniformly loading the polyphase supply with a single phase load reducing the reactance of the load due to the low frequency employed, and preventing sputtering and burning at the weld because of the increase in current flow from an initially low value to the welding value. Such converting systems are also advantageously employed for half cycle resistance spot welding because it is possible to adjust the duration of the current pulse by adjusting the change in frequency secured thereby. When welding with such half cycle welders, it is desirable to start each new welding operation with welding current and voltage of opposite polarities in order to avoid the direct current saturating effect on the welding transformer which would otherwise result from repeated applications of voltages of the same polarity. Such operation with immediately following current pulses of alternate polarity is referred to an anti-polar starting.

There are, however, certain welding operations that require a weld period immediately followed by a heat treating period. Thus in spot welding parts formed of certain aluminum alloys, shrinkage cracks will occur in the weld after its formation if it is immediately subjected to the quenching action resulting from the rapid extraction of heat from the weld by the water cooled electrodes which engage the work parts at the weld. Subsequently heating of the weld while still clamped between the electrodes will not eliminate these cracks, although it may restore some hardness to the weld which may be left in a soft condition due to the rapid cooling immediately following the welding operation.

This quenching action may be eliminated by changing the magnitude of current flow from a welding value to a heat-treating value during the low frequency half cycle supplied by the converter. Since, however, the welding time for the high current values usually employed is quite critical for these aluminum alloys, it is necessary to have this changeover from welding to heat treating current flow occur uniformly at the same selected point in the half cycle of applied current. Specifically this changeover in current value must take place between the firing of a certain two electric discharge devices employed in the electronic converter for generating the low frequency pattern.

In a three phase to single phase converting system, current for each low frequency half cycle is supplied in phase sequence from the A, B, and C phases of the source. The magnitude of current flow is determined by controlling the points in the half cycles of each phase voltage of the three phase source at which current flow is initiated and the time of current flow is determined by controlling the number of phase sequences used in generating the low frequency half cycle of current flow.

In electronic converters, current flow is controlled by electric discharge devices each having an anode, a cathode and a control element whose excitation controls the flow of current between its anode and cathode. The anode-cathode circuits of these electric discharge devices interconnect the polyphase supply conductors with the single phase load conductors which are connected to the welding electrodes. The point in each half cycle of positive anode voltage of the electric discharge devices at which current flow is initiated is determined by phase shift circuits which control the times in the positive half cycles of anode voltages at which a voltage is applied to their control elements to initiate conduction between their anodes and cathodes.

The static phase shift circuits usually employed comprise a bridge, one arm of which is formed by one or more series connected adjustable resistors whose settings determine the amount of phase shift. To provide independent adjustment of the welding current and heat treating current during a half cycle of current flow, at least two such adjustable resistors must be employed and the heat treating adjustable resistor must be shortened from the circuit when the other adjustable resistor is included in the circuit for setting the flow of welding current at a desired value. The most effective way of accomplishing this is by employing the contacts of an electromagnetic relay since it is not possible to obtain as low a resistance short circuit of the heat treating adjustable resistor through the electrodes of an electric discharge device. Furthermore, the different phase voltages for each electric discharge device and the employment of a single control voltage for their controlled operation interpose complications and cost factors which are to be avoided.

The use of such an electromagnetic relay, however, imposes its own complications since it must operate to change the setting of the phase shift circuit it controls at a time not within the heat setting range of welding current adjustment for each phase voltage or else sufficient variation in welding current flow will occur to produce defective welds.

It is an object of our invention to provide an electronic frequency and phase converting system in which an electromagnetic relay is employed for consistently changing the current setting of the converter from a welding value to a heat treating value and in which the effect of variations in operating time of such a relay is minimized by synchronizing its energization with the initiation of current flow in one of the phase pairs of electric discharge devices forming part of the converter.

It is also an object of our invention to provide for anti-polar starting of a half cycle frequency and phase converting system under the control of a timing means which is equally effective for securing the same times of operation irrespective of the 180 electrical degree difference in the starting times of positive and negative phase voltage sequences.

It is another object of our invention to provide means for supplying a substantially uniform voltage signal to the control element of an auxiliary electric discharge device in response to the occurrence of momentary current values of widely varying magnitudes such as flow in the firing circuits of arc discharge devices of the immersion igniter type which are usually employed in converters of the type under consideration.

It is also an object of our invention to provide a control circuit for supplying energization in response to two non-concurrent momentary signal voltages, one of which conditions the circuit for operation in response to the other thereof.

Further objects of our invention will become apparent from a consideration of the embodiment thereof illustrated in the accompanying drawing and described below.

Fig. 1 of the accompanying drawing is a simplified diagrammatic representation of a half cycle frequency and phase converter which embodies our invention.

Fig. 2 is a voltage diagram to which reference will be made in describing the operation of the system illustrated in Fig. 2.

In the half cycle frequency and phase converter shown in the accompanying drawing provision is made for anti-polar starting under control of the same timing means which times out the total time period one-half cycle later for voltages of one polarity than for voltages of the other polarity in order to compensate for the one-half cycle difference in the starting times of these voltages of opposite polarity. After the lapse of the time period for welding current flow, a momentary signal voltage is applied by the timer to the control element of an arm discharge devise which then completes its anode-cathode connection through a current limiting circuit across direct current supply conductors and also connects the cathode of a second arc discharge device to one of these direct current supply conductors. Thereafter a second momentary signal voltage is introduced into the control element circuit of the second arc discharge device in response to current flow in the firing circuit of one of the phase pairs of the main electric discharge devices of the converter. This renders the second arc discharge device conductive to energize the operating winding of a relay which is connected in series with its anode-cathode circuit across the current limiting circuit and consequently across the direct current supply conductors. Operation of the relay then changes the setting of the phase shift circuits employed for controlling the times in positive half cycles of anode voltage when the main electric dicharge devices of the converter become conducting. The converter then operates for the heat treating period at reduced current flow which is often referred to as "tailing" current. After the lapse of the preset tailing current flow period, the timer operates to interrupt the flow of current by applying hold-off voltages to the control elements of the main electric discharge devices of the converter.

Response of the above-referred to second electric discharge device to the firing current of one of the selected phase pairs of main electric discharge devices of the converter is secured by associating a current transformer with each of the selected phase pair of main electric discharge devices and connecting the primary of each current transformer in a different one of these firing circuits of this pair of main electric discharge devices. The secondaries of the current transformers are connected in parallel with one another and in series with the control element circuit of the arc discharge device. Since the firing currents of the main electric discharge device vary widely in magnitude, it is necessary to protect the current transformers and the arc discharge device from over voltage conditions which might occur at the highest firing current values. This protection is obtained by using current transformers having decided drooping characteristics, that is a large regulation of voltage with change in current, and connecting across their secondaries a voltage limiting means such as a resistor having a hyperbolic resistance current characteristic producing a substantially constant voltage across its terminals. A suitable material for this purpose is described and claimed in United States Letters Patent 1,822,742—Karl B. McEachron, granted September 8, 1931.

The frequency and phase converting system shown in Fig. 1 of the drawing comprises a power unit illustrated at the top of the figure, an exciter therefor illustrated at the mid-portion of the figure, and a sequencer illustrated at the bottom of the figure. This sequencer embodies a synchronizing circuit, shown at the lower right-hand portion of the figure, which includes an electro-magnetic relay whose energization is controlled in response to a momentary signal voltage received from the sequencer and a subsequently occurring momentary signal voltage received from the power unit. The operation of this relay controls the settings of the phase shift circuits of the exciter.

The converter per se consists of the power unit and its exciter which together may be considered as a controlling means interconnecting the polyphase supply conductors with the single phase load conductors for current flow of one polarity or the other to the load conductors. This controlling means due to the organization of its exciter has a plurality of settings determinative of the points in the half cycles of voltage of the supply conductors at which current flows from the supply conductors to the load conductors. The sequencer initiates operation of the controlling means at one setting thereof and after a predetermined number of periods of conduction of the controlling means at said one setting, the above referred to relay by its operation changes the setting of the controlling means in response to initiation of current conduction in a particular one of the phase circuits of the controlling means.

In the embodiment illustrated, the power unit supplies current from the three phase supply conductors L1, L2 and L3 to the single phase load conductors connected to the welding electrodes 1 of a resistance welding machine. As shown these electrodes 1 are connected to the secondary 2 of a welding transformer 3 having three primary windings 4, 5 and 6. Each of these three primary windings of the welding transformer is connected across different pairs of the three phase supply conductors through three pairs of reversely connected main electric discharge devices with each pair thereof being connected in series circuit with a different one of the three primary windings of the welding transformer. Thus primary winding 4 of the transformer is connected across the A phase of the supply between supply conductors L1 and L2 through a pair of main electric discharge devices 7 and 8, primary winding 5 of the transformer is connected across the B phase of the supply between supply conductors L2 and L3 through a pair of main electric discharge devices 9 and 10, and primary winding 6 is connected across the C phase of the supply between supply conductors L3 and L1 through a pair of main electric discharge devices 11 and 12.

Each of the main electric discharge devices 7 to 12 inclusive may be of any of the types well known in the art but as illustrated each comprises as anode 13, a mercury pool cathode 14, and an immersion igniter type control element 15. The igniter elements 15 may be formed of a high resistance material such as a mixture of boron carbide and silicon carbide and are arranged in the electric discharge devices so that their tips are immersed in the mercury cathode pools of these devices. The electrodes of each of these devices are enclosed in an envelope which preferably contains, as indicated by the dot, an ionizable medium such as a gas or vapor.

In order to prevent crowding of the drawing with reference numerals only the electrodes of electric discharge device 7 have been identified by numerals. It is to be understood, however, that like electrodes of the remaining electric discharge devices 8 to 12 inclusive will be identified by the same reference numerals, since the like symbolism employed in each case fully identifies like elements.

Each of the main electric discharge devices 7 to 12 inclusive is provided with an anode firing circuit 16 to 21 inclusive. Each of these firing circuits includes its own firing electric discharge device 22 to 27 inclusive. Each of these firing electric discharge devices is provided with an anode 28, a cathode 29 and a control element 30. These reference numerals have been applied only to the electrodes of the firing electric discharge device 22 but it is to be understood that like electrodes of the remaining firing electric discharge devices will be identified by referring to the same reference numerals. The electrodes of each of the firing electric discharge devices is enclosed within an envelope which preferably contains, as indicated by the dot, an ionizable medium such as a gas or vapor.

The firing circuits of each of the main electric discharge devices are completed through the anode-cathode circuit of its associated firing electric discharge device. When current flows in this firing circuit of a main electric discharge device, ionization is produced in this electric discharge device which initiates its conduction. Once conduction is initiated in the main electric discharge device, current flow either ceases or is reduced to a very low value in the firing circuit including the firing electric discharge device associated with the main electric discharge device. Thus current flow in the firing circuit and through the firing electric discharge device is only a momentary occurrence.

Each of the firing electric discharge devices 22 to 27 inclusive has its own control element circuit connecting its control element and cathode. In the arrangements illustrated, each control element circuit is provided with two branches, one of which may be referred to as the heat control branch and the other of which may be referred to as the timing branch. The heat control branch of each of the control element circuits of each of the firing electric discharge devices has been respectively identified in the drawing by reference numerals 31 to 36 inclusive. The timing branch of each of these control element circuits has been respectively identified by reference numerals 37 to 42 inclusive.

The heat control branches of each of the control element circuits of the firing electric discharge devices 22 to 27 inclusive are completed respectively through voltage absorbing resistors 43 to 48 inclusive and the secondary windings 49 to 54 inclusive of the phase shift circuit transformers 55 to 57 inclusive of the exciter. The timing branches of the control element circuits of the firing electric discharge devices are completed respectively through diodes 58 to 63 inclusive and the secondary windings 64 to 69 inclusive of trigger circuit transformers 70 to 75 inclusive and sources of bias voltage 76 to 81 inclusive. It will be noted that the diodes 58 to 63 inclusive are connected in respective timing branches of the control element circuits with anodes connected toward the control elements of their associated firing electric discharge devices 22 to 27 inclusive. The arrangement in each control element circuit of the firing electric discharge devices is such that the more negative of the control voltages in the two branches is effective for controlling the conductivities of the firing electric discharge devices. When no voltages are induced in transformer windings 64 to 69 inclusive, the diodes 58 to 63 inclusive are conducting and the negative bias voltages 76 to 81 inclusive are applied to the control elements of the firing electric discharge devices 22 to 27 inclusive to maintain these devices non-conducting. However, when a turn on voltage is induced in these secondary windings 64 to 69 inclusive, the diodes 58 to 63 inclusive become non-conducting thereby releasing the phase shift voltages of transformer windings 49 to 54 inclusive which then become effective to render the firing electric discharge devices 22 to 27 inclusive conducting in accordance with the phase adjustment of the voltages in these windings relative to the anode voltages of the firing electric discharge devices.

Like the power unit just considered, the exciter therefore is also three phase. The various phase sections thereof have been located immediately below the corresponding phase sections of the power unit. The exciter is energized from supply conductors L1, L2 and L3 through transformers 82, 83 and 84 having their respective primary windings 85, 86 and 87 delta connected with one another and having common terminals of these windings respectively connected to the supply conductors. The secondary windings 88, 89 and 90 of transformers 82, 83 and 84 are provided with grounded mid-taps so that voltages 180 electrical degrees out of phase may be provided for the trigger electric discharge devices 91 to 96 inclusive of the exciter. Each of these trigger electric discharge devices are provided with anodes 97, cathodes 98 and control elements or grids 99. These reference numbers have been applied only to electric discharge device 91 but it is to be understood that corresponding elements of the other electric discharge devices 92 to 96 inclusive will be identified by the same reference numbers of the same parts. Each of the trigger electric discharge devices 91 to 96 inclusive have their electrodes enclosed within an envelope which contains, as indicated by the dot, an ionizable medium such as a gas or vapor.

The anode-cathode circuits of trigger electric discharge devices 91, 93 and 95 are connected across the top half of the secondary windings 88, 89 and 90 for conduction in response to voltages of one polarity and the anode-cathode circuits of trigger electric discharge devices 92, 94 and 96 are connected across the lower halves of these same transformer secondary windings 88, 89 and 90 for conduction in response to voltages of the opposite polarity.

The cathodes of trigger electric discharge devices 91 and 92 of the A phase section of the exciter are connected together and to the mid-tap of transformer winding 88 which is grounded. The anode of electric discharge device 91 is connected to the upper end terminal of transformer winding 88 through the primary winding 100 of a transformer 70 and contacts 101 of an anti-polar relay 102 forming part of the sequencer. The anode of electric discharge device 92 is connected to the lower end terminal of transformer 88 through primary winding 103 of a transformer 71 and contacts 104 of the anti-polar relay 102. The control element of electric discharge device 91 is connected to its cathode through conductor 105, secondary winding 106 of a transformer 107, conductors 108 and 109, an inductance 110, conductor 111 and the lower half of the secondary winding 88 of transformer 82. Since the lower half of transformer winding 88 supplies a voltage which is 180 electrical degrees out of phase with that supplied by the upper half thereof, it will be seen that electric discharge device 91 will be held non-conductive until a turn-on voltage is introduced into its control element circuit as will be described below. The control element of electric discharge device 92 is connected to its cathode through a circuit including conductor 112, the secondary winding 113 of a transformer 114, conductor 115, an inductance 116, conductor 117 and the upper half of the secondary winding 88 of transformer 82. For reasons already given in connection with electric discharge device 91, it is, of course, apparent that electric discharge device 92 is held non-conducting until a turn-on voltage is introduced into its control element circuit as will also be described below. Secondary windings 118 and 119 of transformers 70 and 71 supply respectively turn-on voltages in the control element circuits of trigger electric discharge devices 93 and 94 of the B phase.

The cathodes of trigger electric discharge devices 93 and 94 of the B phase sections of the exciter are connected together and to the grounded mid-tap of the secondary winding 89 of transformer 83. The anode of electric discharge device 93 is connected through the primary winding 120 of transformer 72 to one end terminal of the secondary 89 of transformer 83, and the anode of electric discharge device 94 is connected through the primary winding 121 of transformer 73 to the other end terminal of transformer winding 89. Consequently, these electric discharge devices 93 and 94 are connected for anode conduction in response to voltages of opposite polarity. The control element to cathode circuit of electric discharge device 93 is completed through the secondary winding 118 of transformer 70 and the lower half of the secondary 89 of transformer 83. Thus in the absence of a turn-on voltage in winding 118, electric discharge device 93 is biased off by the voltage of the lower half of transformer winding 89 which is 180 electrical degrees out of phase with the anode voltage of this electric discharge device. The control element to cathode circuit of electric discharge device 94 is completed through the secondary winding 119 of transformer 71 and the upper half of the secondary winding 89 of transformer 83. This electric discharge device is consequently normally biased to non-conduction until a turn-on voltage is introduced in the secondary winding 119 of transformer 71. Transformer 72 has a secondary winding 122 which introduces a turn-on voltage in the control element circuit of trigger electric discharge device 95 and transformer 73 has a secondary winding 123 which is connected in the control element circuit of trigger electric discharge device 96.

The cathodes of electric discharge devices 95 and 96 of the C phase section of the exciter are connected together and to the grounded mid-tap of secondary winding 90 of transformer 84. The anode of trigger electric discharge device 95 is connected through the primary winding 122 of transformer 74 to one end terminal of the secondary 90 of transformer 84 and the anode of trigger electric discharge device 96 is connected through the primary winding 123 of transformer 75 to the other end terminal of this secondary winding 90. The control element circuit of electric discharge device 95 includes the secondary winding 66' of transformer 72 and the lower half of the secondary winding 90 of transformer 84. The control element circuit of electric discharge device 96 includes the secondary winding 67' of transformers 73 and the upper half of the secondary winding 90 of transformer 84. Consequently when the anode voltages of these electric discharge devices are positive, conduction will not occur until turn-on voltages are supplied by windings 122 and 123 to overcome the 180 electrical degree out of phase voltage otherwise applied to their control elements.

Each of the phase sections of the exciter also contains a phase shift circuit for energizing the primary windings 124, 125 and 126 of phase shift transformers 55, 56 and 57. One terminal of the secondary 124 of transformer 55 is connected to the mid terminal of secondary winding 88 of transformer 82. The upper end terminal of secondary winding 88 of transformer 82 is connected through adjustable resistors 127, 128, and 129 to the other terminal of the primary 124 of transformer 55 which other terminal primary 124 is also connected through a capacitor 130 to the lower end terminal of secondary 88 of transformer 82. One terminal of primary winding 125 of transformer 56 is connected to the mid-terminal of the secondary 89 of transformer 83. The upper end terminal of this secondary 89 is connected through adjustable resistors 131, 132 and 133 to the other terminal of the secondary 125 of transformer 56 which other terminal of secondary 125 is also connected through a capacitor 134 to the lower end terminal of the secondary 89 of transformer 83. One end terminal of the primary 126 of transformer 57 is connected to the mid-terminal of the secondary 90 of transformer 84. The upper end terminal of this winding 90 is connected through adjustable resistors 135, 136 and 137 to the other terminal of the primary winding 126 of transformer 57 which other terminal of primary 126 is also connected through a capacitor 138 to the lower end terminal of the secondary winding 90 of transformer 84.

Adjustable resistors 127, 131 and 135, in accordance with their setting, provide an adjustment of the welding current supplied by the converter. The respective sliders of these adjustable resistors are preferably mounted on a common shaft which upon rotation will provide the same heat adjustment in each of the three phases of the exciter. Adjustable resistors 128, 132 and 136 provide for adjustment of the heat treating or tailing current flow. Their sliders likewise are preferably mounted on a common shaft so that all three phases may have a simultaneous adjustment. Adjustable resistors 129, 133 and 137 are provided for setting the phase shift circuits for full heat, that is for initiating current flow at the power factor phase angle of the load circuit. The sliders of these rheostats may likewise be tied together for common operation by a common adjusting means. It will be noted that each of the adjustable resistors 128, 132 and 136, which provide an adjustment of the tailing flow of current, are normally short circuited through contacts 139 of an electromagnetic relay 140.

Relay 140 has an operating winding 141, one terminal of which is connected through conductor 142, contacts 143 of a relay 144, and conductor 145 to the positive terminal of a direct current source of supply 146. The other terminal of winding 141 of relay 140 is connected through a current limiting resistor 147, arc discharge devices 148 and 149 and conductors 150 and 151 to the negative terminal of the direct current source of supply 146. Thus when contacts 143 of relay 144 are closed and both arc discharge devices 148 and 149 become conducting relay winding 141 will receive energization from the direct current source of supply 146.

The arc discharge devices 148 and 149 may be referred to respectively as a relay controlling and a switching arc discharge device in view of the functions performed thereby. Arc discharge device 148 has an anode 151, a cathode 152 and a control element 153. Switching arc discharge device 149 has an anode 154, a cathode 155 and a control element 156. In each case, these electrodes of the respective arc discharge devices are enclosed within an envelope which contains a gas or vapor as is indicated by the dot associated therewith. The control element 156 of arc discharge device 149 is connected to its cathode 155 through the secondary winding 157 of a transformer 158 and a source of bias voltage 159. Due to the bias voltage 159, arc discharge device 149 is normally held nonconducting until a turn-on voltage is induced in the secondary winding 157 of transformer 158. When this occurs, switching arc discharge device 149 becomes conducting and connects the cathode 152 of the relay controlling arc discharge device 148 through conductors 150 and 150' to the negative terminal of the direct current source of supply 146. Arc discharge device 149 completes its own conducting circuit across the direct current source of supply through a current limiting circuit including resistor 147' which is in shunt to the circuit through relay winding 141, resistor 147 and the anode-cathode circuit of arc discharge device 148.

Anode-cathode current flow through relay controlling arc discharge device 148 is initiated by current flow in the firing circuits 20 or 21 of main electric discharge devices 11 or 12 of the power unit. Control element 153 of relay controlling arc discharge device 148 is connected to cathode 152 thereof through conductor 160, a voltage limiting means 161, conductor 162, negative bias voltage means 159 and the cathode-anode circuit of switching arc discharge device 149. Thus, when arc discharge device 149 is conducting and a turn-on voltage appears across the voltage limiting means 161 sufficient to overcome the bias voltage of 159, relay controlling arc discharge device 148 becomes conducting to complete the energizing circuit of the winding 141 of relay 140.

The firing current impulses in firing circuits 20 and 21 of main electric discharge devices 11 and 12 appear as voltages across resistor 161 through the agency of current transformers 163 and 164. The primary winding 165 of current transformer 163 is connected in firing circuit 20 for electric discharge device 11, and the primary winding 166 of current transformer 164 is connected in the firing circuit 21 of main electric discharge device 12. The secondaries 167 and 168 of these current transformers 163 and 164 are connected in parallel with one another across the terminals of the voltage limiting means 161.

The voltage limiting means 161 is provided for not only protecting the current transformers 163 and 164 against overvoltages but also for protecting relay controlling arc discharge device 148 from the same overvoltages. These overvoltages may occur as the direct result of the great variation in magnitude of the current impulses in the firing circuits 20 and 21 of the main electric discharge devices 11 and 12. Protection is provided by using the voltage limiting means in conjunction with current transformers having a substantial voltage regulation resulting in a suitable drooping volt-ampere characteristic. The voltage limiting means 161 is preferably formed of a resistance material having a hyperbolic resistance current characteristic productive of a substantially constant voltage across its terminals. Such a resistor is known to the trade as a Thyrite resistor having the physical and operating characteristics disclosed in United States Letters Patent 1,822,742—Karl B. McEachron, granted September 8, 1931.

The sequencer shown at the bottom of Fig. 1 of the drawing includes electric discharge devices 169 to 175, inclusive. Each of these electric discharge devices has an anode 176, a cathode 177 and a control element 178, which reference numerals are applied only to electric discharge 171 in the drawing, it being understood that reference to corresponding electrodes of the other electric discharge devices of this group will be identified by like reference numerals. Each of these electric discharge devices has its electrodes 176 to 178, inclusive, enclosed within an envelope which contains an ionizable medium such as a gas or vapor as has been indicated in the drawing by the dot associated with each device.

It will be noted that the anodes of electric discharge devices 169 to 172, inclusive, are connected to conductor 117 which is connected to the upper end terminal of the secondary 88 of transformer 82 and that the anodes of electric discharge devices 173 to 175, inclusive, are connected to conductor 111 which is connected to the other end terminal of the secondary winding 88 of transformer 82. The cathodes of all of these electric discharge devices 169 to 175, inclusive, are connected together through conductor 150 which is grounded and consequently connected to the grounded mid-tap terminal of the secondary 88 of transformer 82. Thus, trigger electric discharge device 91 and sequencer electric discharge devices 169 to 172, inclusive, are poled for anode conduction in response to voltages of one polarity, and trigger electric discharge device 92 and sequencer electric discharge devices 173 to 175, inclusive, are connected for anode conduction in response to voltages of the opposite polarity.

Beginning with conduction of electric discharge device 170, electric discharge devices 171 to 175, inclusive, and 91 and 92 occur in predetermined order during half cycles of voltage of opposite polarity supplied by the secondary winding 88 of transformer 82. This result is secured by completing the anode-cathode circuits of these electric discharge devices through inductances and by connecting the control element of the following electric discharge device to the anode connection with said inductance of a leading electric discharge device. By reason of the inductance in the anode-cathode circuits of each of the leading electric discharge devices, anode-cathode current initiated in one of these devices during a positive half cycle of its anode voltage will continue to flow during the first portion of the next negative half cycle, and the voltage drop across the anode-cathode circuit of this electric discharge device due to this carry-over of current flow is used as a control voltage in the control element circuit of the trailing electric discharge device whose anode voltage is positive at the time this current carry-over occurs. This arrangement has been described and claimed in United States Letters Patent 2,574,373—Maurice E. Bivens, granted November 6, 1951, for Electric Valve Control Circuit.

In the arrangement shown, the anode-cathode circuit of electric discharge device 170 is completed through an inductance 179 and the control element 178 of electric discharge device 173 is connected through a timing circuit 180 to the anode connection of electric discharge device 170 with inductance 179. When electric discharge device 170 is non-conducting and conductor 117 is at positive voltage, capacitor 181 of the timing circuit 180 will be charged through the control element to cathode circuit of electric discharge device 173 so as to present a negative hold-off voltage to the control element of this device. When electric discharge device 170 is rendered conducting, capacitor 181 of the timing circuit 180 discharges through the adjustable resistor 182 of this timing circuit, and after the time delay imposed by the timing circuit, electric discharge device 173 becomes conducting due to the anode carry-over voltage drop across electric discharge device 170.

In like manner, the anode carry-over voltage drop across the anode-cathode circuit of electric discharge device 173 will apply to the control element 178 of sequencer electric discharge device 171 and the control element 99 of trigger electric discharge device 91, a voltage which will render these electric discharge devices conducting at the beginning of the next half cycle of voltage following the half cycle of voltage when electric discharge device 173 was conducting.

Conduction of electric discharge device 171 will also in like manner produce a trailing conduction of electric discharge devices 92, 174 and 175. Conduction of electric discharge device 92 will immediately follow conduction of electric discharge device 171, but conduction of electric discharge devices 174 and 175 will occur after the time delay imposed by the timing circuits 183 and 184, respectively, connected in the control element circuits of these electric discharge devices. The time during which welding current flows in a half cycle of the converter load voltage is determined by the setting of timing circuit 183 which consists of a parallel connected capacitor 185 and an adjustable discharge resistance 186. Timing circuit 184 determines the time during which welding current flows and also during which the heat treating or tailing current flows. This timing circuit consists of a capacitor 187 connected in parallel with two adjustable series connected resistors 188 and 189. The setting of resistor 189 determines the tailing current time flow, and the setting of resistor 188 like resistor 186 determines the time for welding current flow. Preferably the sliders of resistors 186 and 188 are connected on the same shaft so that adjustment of one adjustable resistor secures a like adjustment of the other.

The anode-cathode circuit of electric discharge device 174 is completed through the primary winding 190 of transformer 158. Thus, when electric discharge device 174 becomes conducting, a voltage is introduced in the control element circuit of arc discharge device 149 which renders this arc discharge device conducting. The anode-cathode circuit of electric discharge device 175 is completed through the primary winding 191 of transformer 107. When this electric discharge device 175 becomes conductive, it consequently induces a turn-off voltage in the secondary 106 of transformer 107 which turn-off voltage is applied to the control element 99 of electric discharge device 91. The control element 178 of electric discharge device 172 is connected to the anode connection of electric discharge device 175 with the primary winding 191 of transformer 107. Consequently, electric discharge device 172 conducts in trailing response to conduction of electric discharge device 175. The anode-cathode circuit of electric discharge device 172 is completed through the primary winding 192 of transformer 114. Consequently, when electric discharge device 172 becomes conducting, a turn-off voltage is introduced in the secondary winding 113 of transformer 114 which is applied to the control element 99 of electric discharge device 92 to render it non-conducting at the beginning of the next half cycle of voltage.

Electric discharge devices 169 and 170 are held non-conducting but connecting their control elements through resistors 193 and 194, respectively, to conductor 111 whose voltage is 180 electrical degrees out of phase with the anode voltage applied to electric discharge devices 169 and 170 from supply conductor 117. These electric discharge devices are rendered conducting in sequence by a push-button switch 195. When this switch is operated, it first closes its contacts 196 and thereafter its contacts 197. When contacts 196 are closed, the control element of electric discharge device 169 is connected to its cathode and consequently becomes conducting. In like manner, when contacts 197 of the switch are closed, the control element of electric discharge device 170 is connected to its cathode and this electric discharge device then becomes conducting.

Conduction of electric discharge device 169 energizes the operating winding of a solenoid valve S. V. which controls the application of fluid pressure to the piston and cylinder arrangement of the welding machine whereby the welding electrodes are brought into engagement with the work. The operation of electric discharge device 173 in trailing response to conduction of electric discharge device 170 initiates a positive sequence of welding current flow as will appear hereinafter, and the time delay of circuit 180 provides a squeeze time within which the welding machine electrodes may be brought firmly into engagement with the work before welding current flows.

Conduction of electric discharge device 169 also energizes the operating winding 195 of relay 144. As previously stated, pickup of this relay completes the anode connections of arc discharge devices 148 and 149 with the plus terminal of the direct current source of supply 146 through its contacts 143. Relay 144 also has a second set of contacts 196 which, when closed, complete the energizing circuit of the operating winding 197 of the anti-polar relay 102. This energizing circuit is completed from ground through contacts 196, winding 197, the upper half of the secondary 88 of transformer 82, and thence to ground again. The anti-polar relay 102 may be a single relay, as illustrated, or a plurality of relays which alternately establish the anode-cathode circuits of electric discharge devices 91 and 92 so that consecutive welding operations may be initiated with voltages of opposite polarity. In the arrangement illustrated, the energization of winding 197 of anti-polar relay 102 operates a ratchet mechanism which alternately makes and breaks circuits through its contacts 101 and 104 which contacts, as previously described, alternately complete and break the anode-cathode circuits through trigger electric discharge devices 91 and 92 of the exciter. It will be noted by reason of the arrangement illustrated that switches 101 and 104 after operation stay in their operated position until the next energization of the anti-polar relay 102. This result is secured by the star-shaped cam which is rotated a predetermined amount by the ratchet mechanism for each energization of the anti-polar relay 102.

As previously stated, the diagram of Fig. 1 of the drawing has been simplified by eliminating certain details any skilled engineer would embody in such a system. Thus, the heating circuits for the various control electric discharge devices have not been illustrated nor has the means for imposing a delay in operation of the system until these heating circuits have been established for a predetermined length of time so that operation of these electric discharge devices will not be premature and result in damage thereto. Other details have been omitted, such as the parallel connected resistor and capacitor in the control element circuits usually provided as a self-biasing means and the grid current limiting resistors also normally included in these control element circuits. Also, the grid to cathode by-pass capacitors usually provided for the control electric discharge devices have also been omitted. In the sequencer, the transformer and reactor loading resistances usually employed have been omitted also. Recitation of these few details will be suggestive of others which are in the same category and which it is to be understood would be added to the circuit diagram of Fig. 1 in order to produce those refinements that would be introduced into a commercial apparatus.

The system described above as to physical arrangement of parts and their functions will now be further described by setting forth one method of operating the same.

For convenience in identifying the phase voltages of the three-phase source of supply, the voltage between conductors L1 and L2 has been referred to above as the A phase voltage, between conductors L2 and L3 as the B phase voltage, and between conductors L3 and L1 as the C phase voltage of the three-phase source of supply. A complete phase sequence will thus consist of the A, B and C voltages in their order of occurrence.

Assuming that a three-phase voltage has been applied to the supply conductors L1, L2 and L3, an A phase voltage will be applied to the electric discharge devices 169 to 175, inclusive, of the sequencer and to trigger electric discharge devices 91 and 92 of the A voltage portion of the exciter. By reason of their connections, electric discharge devices 91 and 169 to 172, inclusive, may conduct during positive half cycles of the supply voltage whereas electric discharge devices 92 and 173 to 175, inclusive, may conduct during negative half cycles of the supply voltage. In the B phase portion of the exciter, electric discharge devices 93 and 94 are connected to the B phase voltage so that electric discharge device 93 may conduct during a positive half cycle of supply voltage and electric discharge device 94 may conduct during a negative half cycle of supply voltage. In the C phase portion of the exciter, electric discharge devices 95 and 96 are connected to C phase voltages so that electric discharge device 95 may conduct during positive half cycles of the supply voltage and electric discharge device 96 may conduct during negative half cycles of the supply voltage. It will also be noted that each of the three-phase sections of the power unit is under the control of a corresponding phase section of the exciter.

During standby when the system is energized, capacitors 184, 185 and 187 of the timing circuits of the sequencer will be charged during positive half cycles of the supply voltage through the grid-to-cathode rectifying circuits of the electric discharge devices 173 to 175, inclusive. Meanwhile, the firing electric discharge devices 22 to 27, inclusive, will be biased off by the bias voltages 76 to 81, inclusive, in the timing branches of their respective control element circuits. Thus, the phase shift circuits, acting through the heat control branches of these control element circuits, are ineffective. Rheostats 129, 133 and 137 will be adjusted in accordance with the power factor phase angle of the load current of the welder so that heat control voltages may not be applied to the control elements of the firing electric discharge devices before the current zero value and thus produce transient currents through the main electric discharge devices and the load. The rheostats 127, 131 and 135 of the phase shift circuits will be adjusted in order to secure the desired magnitude of welding current flow during the half cycle of low frequency current supplied by the converter. Ordinarily this adjustment extends over the 30 to 110° period of the phase voltage involved. When operating with tailing current flow, however, the range may be no more than between the 30 and 90° points of the voltage wave. Rheostats 128, 132 and 136 of the phase shift circuits will also be adjusted to determine the magnitude of current flow during the heat treating or tailing period which follows immediately after the welding period. It will be noted that each of these last-mentioned rheostats is short-circuited through the contacts 139 of relay 140 whose operating coil 141 is energized in response to current flow in the firing circuits 20 or 21 of the main electric discharge devices 11 and 12.

At the start of an operation, electric discharge devices 169 to 175, inclusive, are biased off, the anode-cathode circuits of arc discharge devices 148 and 149 are open at contacts 143 of relay 144, the anode-cathode circuits of electric discharge devices 91 and 92 are either open at contacts 101 or 104 of the anti-polar relay 102 or biased off by 180° out-of-phase voltages supplied by secondary 83 of transformer 82, and electric discharge devices 93 to 96, inclusive, are also biased off by voltages 180° out of phase with their respective anode voltages.

Operation of pushbutton switch 195 first closes its contacts 196 and thereafter its contacts 197. The closure of contacts 196 causes electric discharge device 169 to become conducting to energize the winding of solenoid valve S. V. and to energize the winding 198 of relay 144. The solenoid valve by its operation supplies pressure fluid to the piston and cylinder arrangement of the welding machine which then functions to bring the welding electrodes of the welding machine toward one another and into engagement with the work located between these electrodes. The operation of relay 144 closes its contacts 143 and 199. The closure of contacts 144 connects the plus terminal of the direct current source 146 to the anodes 151 and 154 of arc discharge devices 148 and 149. The closure of contacts 199 completes the energizing circuit for the operating winding 200 of the anti-polar relay 102. Operation of this relay opens its contacts 104 and closes its contact 101. The opening of contacts 104 opens the anode-cathode circuit of the negative A phase trigger electric discharge device 92, and the closure of contacts 101 completes the anode-cathode circuit of the positive A phase trigger electric discharge device 91 through the primary winding 101 of the trigger circuit transformer 70. Electric discharge device 91 does not conduct however, since its control element voltage is 180° out of phase with its anode voltage due to the bias supplied by the lower half of the secondary 88 of exciter transformer 82.

The closure of contacts 197 of pushbutton switch 195 initiates conduction of electric discharge device 170 when its anode goes positive during a positive half cycle of the supply voltage furnished by the upper half of the secondary 88 of exciter transformer 82. Electric discharge device 173, which may conduct during the next following half cycle of supply voltage, does not conduct, however, due to the delay imposed by the timing circuit 189 whose capacitor 181 applies a negative hold-off voltage to the control element of electric discharge device 173 until it has discharged through the adjustable resistor 182 connected in shunt thereto. After timer 180 has timed out, electric discharge device 173 will conduct during a negative half cycle of the supply voltage in response to the anode carry-over voltage of electric discharge device 170 which, due to the inductance of its anode-cathode circuit, will continue for the first few degrees of the next following half cycle of negative supply voltage occurring after the immediately preceding half cycle of positive supply voltage applied to electric discharge device 170 after timer 180 has timed out. Timer 180 provides a period during which the electrodes of the welding machine may firmly seat themselves against the work before welding current is applied thereto. This delay period is usually referred to as the squeeze timing period of a weld sequencing control.

Conduction of electric discharge device 173 during a negative half cycle of the supply voltage causes conduction of electric discharge devices 171 and 91 at the beginning of the next positive half cycle of supply voltage following the negative half cycle of supply voltage during which electric discharge device 173 was conducting. Thus, conduction of electric discharge device 173 initiates a positive sequence of three-phase supply voltages to the converter as will appear from the following description.

When electric discharge device 91 becomes conducting, it energizes the primary 109 of transformer 70 and induces a turn-on voltage in the secondary windings 64 and 118 of this transformer. Secondary winding 64 is connected in the timing branch of the control element circuit for firing electric discharge device 22. Its turn-on voltage overcomes the bias of 76 also in this circuit to render the diode 58 non-conductive with the result that the heat control branch of the control element circuit of firing electric discharge device 22 takes over and renders it conducting in accordance with the phase shift voltage induced in the secondary winding 49 of the phase shift transformer 55 connected in the A phase shift circuit. Conduction of firing electric discharge device 22 occurs at a time when the anode 13 of main electric discharge device 7 is positive as is its anode 28. A surge of current consequently flows in the firing circuits 16 of main electric discharge device 7 which renders this device conducting with the consequent energization of the primary winding 4 of the welding transformer 3 which is thus connected across the A phase supply conductors L1 and L2.

The positive turn-on voltage induced in the secondary 118 of transformer 70 is still effective at the time positive B phase voltage is applied to the anode of electric discharge device 93. Consequently, this device will then become conducting energizing the primary winding 120 of the trigger circuit transformer 72 to induce a turn-on voltage in the secondary windings 66 and 66' of this transformer. The turn-on voltage induced in secondary 66 of transformer 72 renders firing electric discharge device 24 conducting in response to the phase shift voltage supplied to the secondary 51 of phase shift transformer 56. The positive turn-on voltage induced in secondary winding 66' of transformer 72 is still effective when positive C phase voltage is applied to the anode of electric discharge device 95. Consequently, this electric discharge device will then become conducting to energize primary 122 of transformer 74 which introduces a turn-on voltage into its secondary 68 which causes conduction of firing electric discharge device 26 in accordance with the phase shift setting of the voltage supplied by transformer 57 through its secondary winding 53.

Thus, one complete phase sequence of supply voltages will be applied to the primaries 4, 5 and 6 of the welding transformer 3, since like what occurred in the A phase section of the power unit upon conduction of firing electric discharge device 22, conduction of firing electric discharge devices 24 and 26 will apply surges of current through the control elements 15 of main electric discharge devices 9 and 11 of the B and C phase sections of the power unit, which will cause these devices to conduct in sequence with main electric discharge device 9 taking over conduction from main electric discharge device 7 and main electric discharge device 11 taking over conduction from main electric discharge device 9. Conduction of main electric discharge device 9 connects the primary winding 5 of the welding transformer across supply conductors L2 and L3, and conduction of main electric discharge device 11 connects the primary winding 6 of the welding transformer 3 across supply conductors L3 and L1.

This positive sequence of three-phase voltages will repeat itself until trigger electric discharge device 91 is biased off by conduction of electric discharge device 175 of the sequencer. Conduction of electric discharge device 175 energizes the primary winding 191 of transformer 107 to introduce a turn-off voltage in the secondary 106 of this transformer. This turn-off voltage is in opposition of the turn-on voltage supplied by the anode-cathode drop of electric discharge device 173. Both of these electric discharge devices 173 and 175 conduct during negative half cycles of the supply voltage, and the turn-off voltage of winding 106 is dominant so that when electric discharge device 175 is conducting, electric discharge device 91 no longer responds to conduction of electric discharge device 173. It will be noted that winding 106 of transformer 107 has been reversed in the circuit so as to apply the proper polarity of control voltage to secure this turn-off action, that is, transformer 107 is effective due to the flux decay voltage induced in its winding 106.

Electric discharge device 175 conducts after the time interval imposed by timer 184 which times out after the combined time for welding curent flow and tailing current flow has elapsed. Thus, it is seen that conduction of electric discharge device 175 terminates the positive half cycle of welding and heat treating current flow.

In the arrangement illustrated, change-over from welding to tailing current flow during the output half cycle of the converter occurs between the firing of main electric discharge devices 11 and 7 and in response to the firing of main electric discharge device 11. This change-over is secured by initiating energization of the operating winding 141 of relay 140 in response to the firing of main electric discharge device 11 by the pulse of current flow in its firing circuit 20. As previously described, the energization of operating winding 141 of relay 140 is controlled by the conduction of both of the arc discharge devices 148 and 149.

The time for welding current flow during the low frequency half cycle of the converter is determined by timer 183 which controls the delay period between conduction of electric discharge device 174 in response to conduction of electric discharge device 171. When electric discharge device 174 becomes conducting after timer 183 has timed out, it energizes the primary winding 190 of transformer 158 inducing a turn-on voltage in the secondary winding 157 thereof. This turn-on voltage overcomes the bias voltage 159 in the control element circuit of arc discharge device 149 causing this arc discharge device to become conducting and complete its circuit across the direct current source of supply 146 through conductors 145 and 142, current limiting resistor 147' and conductors 150 and 150'. Once this arc discharge device 149 has become conducting, it will remain conducting until its anode-cathode connection with direct current source of supply 146 is interrupted by the opening of contacts 143 of relay 144. When arc discharge device 149 becomes conducting, it connects the cathode 152 of arc discharge device 148 to the negative terminal of the source of supply 146 through its anode-cathode circuit and conductors 150 and 150'. The anode 151 of arc discharge device 148 is connected to the positive terminal of this direct current source of supply through conductor 145, contacts 143 of relay 144, conductor 142, the operating winding 141 of relay 140, and current limiting resistor 147. Thus, when a pulse of current flows in the firing circuit 20 of main electric discharge device 11, current transformer 163 having its primary 165 in this firing circuit and its secondary 167 in the control element circuit of electric discharge device 148 applies a turn-on voltage in the control element circuit of arc discharge device 148 which overcomes bias 159 also in this circuit and causes arc discharge device 148 to become conducting.

When arc discharge device 148 becomes conducting in addition to the conductivity of arc discharge device 149, relay winding 141 is energized and operates relay 140 to open its contacts 139. The opening of these contacts introduces the adjustable resistance of resistors 128, 132 and 137 into the A, B and C phase shift circuits of the exciter. Consequently, when trigger electric discharge device 91 again becomes conducting, firing electric discharge device 22 will become conducting at a later point in the positive half cycle of its A phase anode voltage and thus cause main electric discharge device 7 to become conducting at this latter time with a consequent reduction in the flow of current to the primary 4 of the welding transformer. This same reduced current flow will also occur in the main electric discharge devices 9 and 11 of the B and C phases until the low frequency half cycle is terminated by conduction of electric discharge device 175, as previously described.

It will be noted that irrespective of the welding current setting determined by the phase shift circuits of the exciter, there is a 120 electrical degree time interval between conduction of main electric discharge device 11 and the subsequent conduction of main electric discharge device 7. This is the time period provided for operation of relay 140 in response to the energization of its operating winding 141. Assuming that the average operating time of a relay 140 made in accord with particular design manufacturing instructions is 60 electrical degrees of a phase voltage of the three-phase source of supply, it will be appreciated that there is a considerable period of time available for variations in its operating time such as may occur from slight variations in its manufacture or as a result of variations in the voltage applied to its operating winding. Thus, by synchronizing the energization of relay 140 to the firing of main electric discharge device 11, a longer time interval is provided for pickup of the relays than could be accomplished by other means of synchronization such as, for example, by synchronizing energization of the relay with line voltage. Assuming a favorable operating condition in which the welding current adjustment is between the 30 and 90° points on the anode voltage of the phase being employed, there would only be a period of 60 electrical degrees available for pickup operation of the relay if its operation were synchronized with the line voltage. Of course, if a wider range of adjustment is provided for welding current flow, then still much less time is provided for this pickup operation of the relay when its energization is synchronized with the line voltage.

This feature of applicants' system has been made graphic in the voltage diagram of Fig. 2 of the drawing. This shows two consecutive complete phase sequences of the three-phase supply voltage, A1, B1 and C1 followed by A2, B2 and C2. Assume that timer 183 has been set for zero time delay so that the welding current flow will be supplied for only one complete phase sequence, then electric discharge device 174 becomes conducting at about point $a$ of the diagram at the beginning of a negative half cycle of the A1 phase voltage. This renders arc discharge device 149 conducting and prepares the synchronizing circuit for operation in response to conduction of arc discharge device 148.

Assuming a full welding heat setting for the phase shift circuits of the exciter, conduction of the main electric discharge devices will occur at the 30° points of their phase voltages. In the system shown, conduction of C phase current supplies energization to the relay winding 141 of relay 140 in response to the firing impulses in firing circuits 20 or 21 of main electric discharge devices 11 or 12. As pointed out above, during a positive sequence of voltages, the firing pulse in circuit 20 energizes current transformer 163 to apply a turn-on voltage in the control element circuit of arc discharge device 148 which then conducts and completes the energizing circuit of winding 141 of relay 140. For a positive sequence at full heat setting, relay 140 is thus energized at point $b$ and must pick up before point $d$ when full heat conduction of the A2 phase will start. This provides a 120 electrical degree operating period for the relay.

Assume a welding heat control adjustment of the exciter over the range of 30 to 110° of the anode phase voltages of the main electric discharge devices 7 to 12, inclusive. Then conduction of main electric discharge device 11 of the C phase begins at point $b$ for full heat but may be delayed as late at point $c$ for minimum heat. For operation outside the heat adjustment range, a relay whose energization was synchronized with the line voltage would have to pick up within the time $cd$ or 40 electrical degrees. Of course, its energization might be applied at an earlier time by some phase shift circuit arrangement, but pickup must occur within this $cd$ range or else the welding period would be shortened if relay pickup occurred before $c$, when operating at this minimum heat setting, or lengthened if relay pickup occurred after $d$ when operating at the maximum heat setting. With applicants' arrangement, however, pickup may always occur within a range of 120 electrical degrees.

Thus, if C1 phase conduction starts at $b$, the following A2 phase conduction starts at $d$ or 120 elecrical degrees later and this same gap is always provided irrespective of the heat setting of the exciter for, if conduction of the C1 phase occurred at $c$, conduction of the A2 phase would occur at $e$ for the same heat setting and thus provide the same gap of 120 electrical degrees for operation of the relay.

For a positive sequence of phase voltages, arc discharge device 149 becomes conducting at point $a$ of Fig. 2 and arc discharge device 148 becomes conducting within the range $bc$ depending on the heat setting of the exciter. For a negative sequence of phase voltages, arc discharge device 149 becomes conducting at the same point $a$, but conduction of arc discharge device 148 is delayed 180 electrical degrees by the corresponding delay in the operating time of main electric discharge device 12 relative to the operating time of main electric discharge device 11 and occurs within the range $fg$ depending on the welding heat adjustment of the exciter.

It will also be noted that in applicants' arrangement relay 140 is operated by controlling its energization in response to two non-current momentary signal voltages, one of which is permissive to control in response to the other. Thus, arc discharge device 149 becomes conducting in response to a momentary voltage induced in transformer winding 157 which occurs at a time prior to the application of a momentary voltage in the control element circuit of arc discharge device 148 in response to current flow in the firing circuit 20 of main electric discharge device 11. The relay operating circuit is thus conditioned by a momentary signal voltage for operation thereafter in response to another momentary signal voltage which may vary widely in magnitude due to the voltage limiting arrangement provided in the control element circuit of arc discharge device 148.

With applicants' arrangement, it will be noted that during a positive half cycle of current flow supplied by the converter, change-over from a welding value of current to a tailing value of current will occur without interruption in the flow of current and that consistency in operation is provided by furnishing a sufficient time interval for relay 140 to operate in accomplishing this result.

To initiate the next welding operation, the operator must release pushbutton 195 and again close the same. Upon release of pushbutton 195, the system resets itself and when the pushbutton is again closed, the system is again set into operation, but this time with a negative sequence of phase voltages as determined by the anti-polar relay 102. When this relay is again operated, it opens the anode-cathode circuit of trigger electric discharge device 91 and closes the anode-cathode circuit of trigger electric discharge device 92. Consequently, control is shifted to firing electric discharge devices 23, 25 and 27 which control main electric discharge devices 8, 10 and 12. Since these main electric discharge devices 8, 10 and 12 are reversely connected between the supply conductors and the load conductors relative to the connections of main electric discharge devices 7, 9 and 11, negative sequences of three-phase voltages will be supplied to the load.

Since the negative sequence of phase voltages begins 180 electrical degrees later than a positive sequence, it is necessary to modify the over-all timing operation of the sequencer by extending the timing period by one-half cycle. Thus, instead of having the time period end upon conduction of electric discharge device 175, the timing period ends upon conduction of electric discharge device 172 of the sequencer which operates in trailing response to electric discharge device 175 but one-half cycle later. When electric discharge device 172 conducts, it energizes the primary winding 195 of transformer 114 and induces a turn-off voltage in its winding 113 which is connected in the control element circuit of electric discharge device 92. With this added step in the operational sequence, the system operates to supply a negative sequence of voltages to the primary windings 4, 5 and 6 of the welding transformer in the same manner as above described for the supply of a positive sequence of voltages.

It is, of course, obvious that applicants' invention is not limited to the particular embodiment thereof illustrated in the drawing and described above. Our invention may be variously modified without departing from the spirit and scope of the teachings thereof. Other arrangements will occur to those skilled in the art, and modifications of the circuits employed may be made in accordance with particular circumstances such as the type of electric discharge devices employed, the employment of equivalent circuits and the like. We, therefore, aim in the appended claims to cover all such changes and modifications as fall within the true spirit and scope of our invention.

What we claim as new and desire to secure by Letters Patent of the United States is:

1. Means responsive to two non-concurrent momentary signal voltages one of which is permissive to control in response to the other thereof, said means including two arc discharge devices each having an anode, a cathode, a control element and a control element circuit connecting its said control element and cathode, direct current supply conductors, a current limiting circuit having terminals connected across said direct current supply conductors in series with the anode-cathode circuit of one of said arc discharge devices, load conductors connected across said terminals of said current limiting circuit in series with the anode-cathode circuit of the other of said arc discharge devices, bias voltage means connected in the control element circuits of said arc discharge devices for rendering said devices non-conducting, said bias means having a voltage less than the voltage of either of said signal voltages, means for introducing said one of said momentary signal voltages in the control element circuit of said one of said arc discharge devices, and means for introducing said other of said momentary signal voltage in the control element circuit of said other of said arc discharge device.

2. Control apparatus conditioned by a momentary signal voltage for operation thereafter in response to momentary signal voltages of widely varying magnitude, said apparatus comprising two arc discharge devices each having an anode, a cathode, a control element and a control element circuit connecting its said control element and cathode, direct current supply conductors, a current limiting circuit having terminals connected across said direct current supply conductors in series with the anode-cathode circuit of one of said arc discharge devices, load conductors connected across said terminals of said current limiting circuit in series with the anode-cathode circuit of the other of said arc discharge devices, bias voltage means connected in the control element circuits of said arc discharge devices for rendering said devices non-conducting, said bias means having a voltage less than said respective signal voltages, means for introducing said conditioning momentary signal voltage in the control element circuit of said one of arc discharge devices, transforming apparatus having a drooping voltage characteristic and having inductively coupled primary and secondary windings, means for applying said momentary signal voltages of widely varied magnitude to said primary winding of said transforming apparatus, a voltage limiting means having a hyperbolic resistance-current characteristic productive of a substantially constant voltage across its terminals, and means connecting the terminals of said voltage limiting means across said secondary winding of said transforming apparatus and in the control element circuit of said other of said arc discharge devices.

3. Apparatus comprising supply conductors, load conductors, controlling means interconnecting said supply conductors and said load conductors and having a plurality of operating conditions, a timer, means for initiating operation of said controlling means under one of its operating conditions and for simultaneously initiating operation of said timer, two arc discharge devices each having an anode, a cathode, a control element and a control element circuit connecting its said control element and cathode, direct current supply conductors, a current limiting circuit having terminals connecting across said direct current supply conductors in series with the anode-cathode circuit of one of said arc discharge devices, means for changing the operating condition of said controlling means, said means including an energizing circuit connected across said terminals of said current limiting circuit in series with the anode-cathode circuit of the other of said arc discharge devices, means responsive to the timing out operation of said timer for introducing a turn-on signal voltage in the control element circuit of said one of said arc discharge devices, means responsive to an electrical characteristic of said controlling means for introducing a turn-on signal voltage in the control element circuit of said other of said arc discharge devices, and bias voltage means connected in the control element circuits of said arc discharge devices for rendering said devices non-conducting, said bias means having a voltage less than said respective turn-on signal voltages.

4. Apparatus comprising alternating current supply conductors, alternating current load conductors, controlling means interconnecting said supply conductors and said load conductors for current flow of one polarity to said load conductors, said controlling means having a plurality of settings determinative of the points in the half cycles of voltage of said supply conductors at which current flows from said supply conductors to said load conductors, means for initiating operation of said controlling means at one setting thereof, a relay having an input circuit and an output circuit operated by controlling the energization of said input circuit, means responsive to the operation of said output circuit of said relay for changing the setting of said controlling means, and means responsive after a predetermined number of periods of conduction of said controlling means at said one setting thereof for controlling the energization of said relay input circuit.

5. Apparatus comprising polyphase alternating current supply conductors, polyphase alternating current load conductors, controlling means connecting said supply conductors with said load conductors for current flow of one polarity in a predetermined phase sequence, said controlling means having a plurality of settings determinative of the points in the half cycles of voltage of said supply conductors at which current flows from said supply conductors to said load conductors, means for initiating operation of said controlling means at one setting thereof, a relay having an input circuit and an output circuit operated by controlling the energization of said input circuit, means responsive to the operation of said output circuit of said relay for changing the setting of said controlling means, and means responsive to the initiation of a current flow of one phase of said phase sequence in said controlling means at said one setting thereof after it has occurred a predetermined number of times for controlling the energization of said relay input circuit.

6. Apparatus comprising polyphase supply conductors, polyphase load conductors, a group of electric discharge devices each having an anode, a cathode, a control element, and a control element circuit connecting its control element and cathode, means connecting said anodes and cathodes of said electric discharge devices in circuit with said supply conductors for applying voltages of the same polarity to said load conductors, a phase shift circuit for each of said electric discharge devices, a relay having an operating winding and pairs of contacts each pair of which is connected in a different one of said phase shift circuits for controlling the phase shift setting thereof in accordance with the closing and opening of said contacts, a timer means initiating operation of said timer and conduction of said electric discharge devices in phase sequence beginning with conduction in one of said electric discharge devices, and means effective after the timing out operation of said timer and responsive to conduction in one of said electric discharge devices for initiating the energization of said relay.

7. Apparatus comprising alternating current supply conductors, alternating current load conductors, a first electric discharge device having an anode, a cathode, a control element, and a control element circuit connecting its said control element and cathode, means for connecting said anode and cathode of said first electric discharge device in circuit with said supply conductors and said load conductors, a relay having contacts and an operating winding whose energization controls the opening and closing of its said contacts, normally inoperative heat control means in said control element circuit of said first electric discharge device, said heat control means including the contacts of said relay for setting in accordance with the open and closed conditions of said contacts different times during positive half cycles of anode voltage of said first electric discharge device at which current flow is initiated in its said anode-cathode circuit, means for applying in the control element circuit of said first electric discharge device a turn-on voltage which renders said heat control means effective in said control element circuit, direct current conductors, a second electric discharge device having an anode, a cathode, a control element and a control element circuit connecting its said control element and cathode, means for connecting said anode and cathode of said second electric discharge device in circuit with said operating winding of said relay across said direct current conductors, and means responsive to current flow in said anode-cathode circuit of said first electric discharge device for introducing in the control element circuit of said second electric discharge device a voltage which initiates anode-cathode conduction of said second electric discharge device.

8. Apparatus comprising alternating current supply conductors, alternating current load conductors, a first electric discharge device having an anode, a cathode, a control element, and a control element circuit connecting its said control element and cathode, means for connecting said anode and cathode of said first electric discharge device in circuit with said supply conductors and said load conductors, a relay having contacts and an operating winding whose energization controls the opening and closing of its said contacts, normally ineffective heat control means in said control element circuit of said first electric discharge device, said heat control means including the contacts of said relay for setting in accordance with the open and closed conditions of said contacts different times during positive half cycles of anode voltage of said first electric discharge device at which current flow is initiated in its said anode-cathode circuit, when said heat control means is rendered effective, timing means having a first timing period immediately followed by a second timing period, means for starting said timing means and for applying in the control element circuit of said first electric discharge device a turn-on voltage which renders said heat control means effective in said control element circuit, direct current conductors, a second electric discharge device having an anode, a cathode, a control element and a control element circuit connecting its said control element and cathode, means responsive to operation of said timing means at the end of its said first timing period for connecting said anode and cathode of said second electric discharge device in circuit with said operating winding of said relay across said direct current conductors, means responsive to current flow in the anode-cathode circuit of said first eletric discharge device for introducing in the control element circuit of said second electric discharge device a voltage which initiates anode-cathode conduction of said second electric discharge device, and means responsive to operation of said timing means at the end of its said second timing period for applying in the control element circuit of said first electric discharge device a turn-off voltage which renders said heat control means ineffective in its said control element circuit.

9. Apparatus comprising supply conductors, load conductors, a main electric discharge device having an anode, a cathode, a control element and a control element circuit connecting its said control element and cathode means for connecting said anode and cathode of said main electric discharge device in circuit with said supply and said load conductors, a firing electric discharge device having an anode, a cathode, a control element, and a control element circuit connecting its said control element and cathode, normally inoperative phase shift means connected in the control element circuit of said firing electric discharge device, means for introducing a turn-on voltage in the control element circuit of said firing electric discharge device which renders said phase shift means effective, a relay having an operating winding and a pair of contacts connected in said phase shifting circuit for controlling the phase shift setting thereof in accordance with the closed and opened conditions of said contacts, means connecting said anode and cathode of said firing electric discharge device in the control element circuit of said main electric discharge device, and means responsive to the flow of current in the control element circuit of said main electric discharge device for initiating the energization of said winding of said relay.

10. Apparatus comprising polyphase supply conductors, polyphase load conductors, a group of main electric discharge devices each having an anode, a cathode, a control element, and a control element circuit connecting its said control element and cathode, means connecting said anodes and cathodes of said main electric discharge devices in circuit with said supply conductors for supplying a sequence of phase voltages of the same polarity to said load conductors, firing electric discharge devices each having an anode, a cathode, a control element and a control element circuit connecting its said control element and cathode, means for connecting the anode-cathode circuits of each of said firing electric discharge devices in a control element circuit of a different one of said main electric discharge devices, phase shift circuits each of which is connected in a different one of said control element circuits of said firing electric discharge devices, a relay having an operating winding and pairs of contact each pair of which is connected in a different one of said phase shift circuits for controlling the phase shift setting thereof in accordance with the closing and opening of said contacts, means for initiation conduction of said firing electric discharge devices under the control of said phase shift circuits and in phase sequence beginning with conduction of one of said firing electric discharge devices, and means responsive after a predetermined time delay to the flow of current in the control element circuit of one of said main electric discharge devices for initiating the energization of said relay.

11. Apparatus comprising alternating current supply conductors, alternating current load conductors, a main electric discharge device having an anode, a cathode, a control element and a control element circuit connecting its said control element and cathode, means for connecting said anode and cathode of said main electric discharge device in circuit with said supply and said load conductors, a firing electric discharge device having an anode, a cathode, a control element and a control element circuit connecting its said control element and cathode, phase shift means connected in the control element circuit of said firing electric discharge device, means for applying in the control element circuit of said firing electric discharge device a bias voltage which renders said phase shift means ineffective for initiating anode-cathode conduction of said firing electric discharge device, means for introducing in the control element circuit of said firing electric discharge device a turn-on voltage which overcomes said bias voltage and renders said phase shift means effective for initiating anode-cathode conduction of said firing electric discharge device, a relay having an operating winding and a pair of contacts connected in said phase shift means for controlling its setting in accordance with the closed and opened positions of said contacts, a current transformer having a primary winding and a secondary winding, means connecting said anode and cathode of said firing electric discharge device in series with the primary winding of said current transformer and in said control element circuit of said main electric discharge device, a pair of arc discharge devices each having an anode, a cathode, a control element and a control element circuit connecting its said control element and cathode, direct current supply conductors, means for connecting the operating winding of said relay through the anode-cathode circuits of said arc discharge devices across said direct current supply conductors, a voltage limiting means connected across said secondary winding of said current transformer and in said control element circuit of one of said arc discharge devices in series with the anode-cathode circuit of the other of said arc discharge devices, means for introducing a turn-on voltage in the control element circuit of said other of said arc discharge devices after said main electric discharge device has been rendered conductive a predetermined number of times, and means in the control element circuits of said arc discharge devices for rendering them non-conducting respectively in the absence of said turn-on voltage and a voltage of said voltage limiting means.

12. Apparatus comprising alternating current supply conductors, alternating current load conductors, a main electric discharge device having an anode, a cathode, a control element and a control element circuit connecting its said control element and cathode, a means for connecting said anode and cathode of said main electric discharge device in circuit with said supply and said load conductors, a firing electric discharge device having an anode, a cathode, a control element and a control element circuit connecting its said control element and cathode, phase shift means connected in the control element circuit of said firing electric discharge device, means for applying in the control element circuit of said firing electric discharge device a bias voltage which renders said phase shift means ineffective for initiating anode-cathode conduction of said firing electric discharge device, means for introducing in the control element circuit of said firing electric discharge device a turn-on voltage which overcomes said bias voltage and renders said phase shift means effective for initiating anode-cathode conduction of said firing electric discharge device, a relay having an operating winding and a pair of contacts connected in said phase shift means for controlling its setting in accordance with the closed and opened position of said contacts, a current transformer having a primary winding and a secondary winding, means connecting said anode and cathode of said firing electric discharge device in series with said primary winding of said current transformer and in said control element circuit of said main electric discharge device, a pair of arc discharge devices each having an anode, a cathode, a control element and a control element circuit connecting its said control element and cathode, direct current supply conductors, means for connecting the operating winding of said relay through the anode-cathode circuits of said arc discharge devices across said direct current supply conductors, means for connecting said secondary winding of said current transformer in said control element circuit of one of said arc discharge devices in series with the anode-cathode circuit of the other of said arc discharge devices, means for introducing a turn-on voltage in the control element circuit of said other of said arc discharge devices after said main electric discharge device has been rendered conductive a predetermined number of times, and means in the control element circuits of said arc discharge devices for rendering them non-conducting respectively in the absence of said turn-on voltage and a voltage of said voltage limiting means.

13. Apparatus comprising polyphase supply conductors, polyphase load conductors, main electric discharge devices each having an anode, a cathode, a control element and a control element circuit connecting its said control element and cathode, means connecting said anodes and cathodes of said main electric discharge devices in circuit with phase pairs of said supply conductors for supplying current of the same polarity to said load conductors, firing electric discharge devices equal in number to said main electric discharge devices each having an anode, a cathode, a control element and a control element circuit connecting its said control element and cathode, means for connecting the anode-cathode circuit of each of said firing electric discharge devices in the control element circuit of a different one of said main electric discharge devices, a control transformer having a secondary winding and a primary winding connected in the control element circuit of one of said main electric discharge devices in series with the anode and cathode of said firing electric discharge device in said circuit, phase shift circuits each of which is connected in the control element circuit of a different one of said firing electric discharge devices, a relay having an operating winding and pairs of contacts each pair of which is connected in a different one of said phase shift circuits for controlling its phase shift setting in accordance with the closing and opening of said contacts, direct current supply conductors, a relay controlling electric discharge device having an anode, a cathode, a control element, and a control element circuit connecting its said control element and cathode, means for connecting the anode of said relay controlling electric discharge device in series circuit with the operating winding of said relay, a switching electric discharge device having an anode, a cathode, a control element, and a control element circuit connecting its said control element and cathode, means for connecting the anode-cathode circuit of said switching electric discharge device between the cathode of said relay controlling electric discharge device and one of said direct current supply conductors and also in the control element circuit of said relay controlling electric discharge device in series with the secondary winding of said control transformer, a first timer for determining the period of current flow in said main electric discharge devices at one setting of said phase shift circuits, a second timer for determining the period of current flow through said main electric discharge devices at said one setting of said phase shift circuit followed immediately by a different setting thereof, means responsive to the timing out of said first timer for applying a turn-on voltage in the control element circuit of said switching electric discharge device, exciting means for introducing in the control element circuits of said firing electric discharge devices, control voltages beginning with a voltage of a predetermined phase and continuing in phase sequence thereafter, means for completing and interrupting the anode connection of said relay controlling electric discharge device with the other of said direct current conductors, means for initiating operation of said timers simultaneously with the initiation of operation of said exciting means, and means responsive to the timing out of said second timer for arresting the operation of said exciting means.

14. Apparatus comprising polyphase supply conductors, polyphase load conductors, main electric discharge devices each having an anode, a cathode, a control element and a control element circuit connecting its said control element and cathode, means connecting said anodes and cathodes of said main electric discharge devices in circuit with phase pairs of said supply conductors for supplying current of the same polarity to said load conductors, firing electric discharge devices equal in number to said main electric discharge devices and each having an anode, a cathode, a control element and a control element circuit connecting its said control element and cathode, means for connecting the anode-cathode circuit of each of said firing electric discharge devices in the control element circuit of a different one of said main electric discharge devices, a control transformer having a secondary winding and a primary winding connected in the control element circuit of one of said main electric discharge devices and in series with the anode and cathode of said firing electric discharge device in said circuit, phase shift circuits each of which is connected in the control element circuit of a different one of said firing electric discharge devices, a relay having an operating winding and pairs of contacts each pair of which is connected in a different one of said phase shift circuits for controlling its phase shift setting in accordance with the closing and opening of said contacts, direct current supply conductors, a relay controlling electric discharge device having an anode, a cathode, a control element, and a control element circuit connecting its said control element and cathode, means for connecting the anode of said relay controlling electric discharge device in series circuit with the operating winding of said relay, a switching electric discharge device having an anode, a cathode, a control element, and a control element circuit connecting its said control element and cathode, means for connecting the anode-cathode circuit of said switching electric discharge device between the cathode of said relay controlling electric discharge device and one of said direct current supply conductors and also in the control element circuit of said relay controlling electric discharge device in series with the secondary winding of said control transformer, voltage limiting means connected across said secondary winding, a first timer for determining the period of current flow in said main electric discharge devices, a second timer for determining the period of current flow through said main electric discharge devices at said one setting of said phase shift circuit followed immediately by a different setting thereof, means responsive to the timing out of said first timer for applying a turn-on voltage in the control element circuit of said switching electric discharge device, exciting means for introducing in the control element circuits of said firing electric discharge devices beginning with a voltage of a predetermined phase and continuing in phase sequence thereafter, means for completing and interrupting the anode connection of said relay controlling electric discharge device with the other of said direct current conductors, means for initiating operation of said timers simultaneously with the initiation of operation of said exciting means, and means responsive to the timing out of said second timer for arresting the operation of said exciting means.

15. Apparatus comprising polyphase supply conductors, polyphase load conductors, phase pairs of main electric discharge devices each having an anode, a cathode, a control element and a control element circuit connecting its said control element and cathode, means reversely connecting said anodes and cathode of each pair of said main electric discharge devices in circuit with phase pairs of said supply and load conductors, phase pairs of firing electric discharge devices associated with each phase pair of said main electric discharge devices, each of said firing electric discharge devices having an anode, a cathode, a control element and a control element circuit connecting its said control element and cathode, means for connecting the anode-cathode circuit of each of said firing electric discharge devices of a phase pair in the control element circuit of a different one of its associated phase pair of said main electric discharge devices, a pair of control transformers each having a secondary winding and a primary winding connected in said control element circuit of a different one of one phase pair of said main electric discharge devices and in series with said anode and cathode of said associated firing electric discharge device in said circuit, phase shift circuits each of which is connected in the control element circuits of different phase pairs of said firing electric discharge devices, a relay having an operating winding and pairs of contacts each pair of which is connected in a different one of said phase shift circuits for controlling its phase shift setting in accordance with the closing and opening of its said contacts, direct current supply conductors, a relay controlling electric discharge device having an anode, a cathode, a control element and a control element circuit connecting its said control element and cathode, means for connecting the anode of said relay controlling electric discharge device in series circuit with the operating winding of said relay, a switching electric discharge device having an anode, a cathode, a control element and a control element circuit connecting its said control element and cathode, means for connecting the anode-cathode circuit of said switching electric discharge device between the cathode of said relay control electric discharge device and one of said direct current supply conductors and also in said control element circuit of said relay controlling electric discharge device in series with the parallel connected secondary windings of said control transformers, exciting means for selectively introducing a sequence of control voltages in said control element circuits of each group of said firing electric discharge devices whose anodes and cathodes are connected to supply current of the same polarity from said supply conductors to said load conductors, said control voltages of a sequence beginning with a voltage of one phase and polarity and continuing in phase sequence thereafter with the same polarity, means for alternately selecting the operating polarity of said exciting means and for completing with each said selection the anode connection of said relay controlling electric discharge device with the other of said direct current conductors, timing means for establishing a first timing period followed immediately by a second timing period, means for starting said timing means with a predetermined phase voltage at one polarity, means responsive to the timing out operation of said timing means at the end of its said first timing period for applying a turn-on voltage in the control element circuit of said switching electric discharge device, and means responsive to the timing out operation of said timing means at the end of its said second timing period for immediately arresting the operation of said exciting means when it is operating at said one polarity and after a half cycle delay when it is operating at said other polarity.

16. Apparatus comprising polyphase supply conductors, polyphase load conductors, phase pairs of main electric discharge devices each having an anode, a cathode, a control element and a control element circuit connecting its said control element and cathode, means reversely connecting said anodes and cathode of each pair of said main electric discharge devices in circuit with phase pairs of said supply and load conductors, phase pairs of firing electric discharge devices associated with each phase pair of said main electric discharge devices, each of said firing electric discharge devices having an anode, a cathode, a control element and a control element circuit connecting its said control element and cathode, means for connecting the anode-cathode circuit of each of said firing electric discharge devices of a phase pair in the control element circuit of a different one of its associated phase pair of said main electric discharge devices, a pair of control transformers each having a secondary winding and a primary winding connected in said control element circuit of a different one of one phase pair of said main electric discharge devices and in series with said anode and cathode of said associated firing electric discharge device in said circuit, a voltage limiting means connected across said secondary winding of said control transformers, phase shift circuits each of which is connected in the control element circuits of different phase pairs of said firing electric discharge devices, a relay having an operating winding and pairs of contacts each pair of which is connected in a different one of said phase shift circuits for controlling its phase shift setting in accordance with the closing and opening of its said contacts, direct current supply conductors, a relay control electric discharge device having an anode, a cathode, a controlling element and a control element circuit connecting its said control element and cathode, means for connecting the anode of said relay controlling electric discharge device in series circuit with the operating winding of said relay, a switching electric discharge device having an anode, a cathode, a control element and a control element circuit connecting its said control element and cathode, means for connecting the anode-cathode circuit of said switching electric discharge device between the cathode of said relay controlling electric discharge device and one of said direct current supply conductors and also in said control element circuit of said relay controlling electric discharge device in series with said voltage limiting means, exciting means for selectively introducing a sequence of control voltages in said control element circuits of each group of said firing electric discharge devices whose anodes and cathodes are connected to supply current of the same polarity from said supply conductors to said load conductors, said control voltages of a sequence beginning with a voltage of one phase and polarity and continuing in phase sequence thereafter with the same polarity, means for alternately selecting the operating polarity of said exciting means and for completing with each said selection the anode connection of said relay controlling electric discharge device with the other of said direct current conductors, timing means for establishing a first timing period followed immediately by a second timing period, means for starting said timing means with a predetermined phase voltage at one polarity, means responsive to the timing out operation of said timing means at the end of its said first timing period for applying a turn-on voltage in the control element circuit of said switching electric discharge device, and means responsive to the timing out operation of said timing means at the end of its said second timing period for immediately arresting the operation of said exciting means when it is operating at said one polarity and after a half cycle delay when it is operating at said other polarity.

References Cited in the file of this patent

UNITED STATES PATENTS

| Number | Name | Date |
|---|---|---|
| 2,119,194 | Babler | May 31, 1938 |
| 2,492,730 | Bishoff | Dec. 27, 1949 |